Sept. 2, 1969  H. S. FALL  3,464,744
HEAVY-DUTY CHASSIS TRACK
Filed April 19, 1967  3 Sheets-Sheet 1
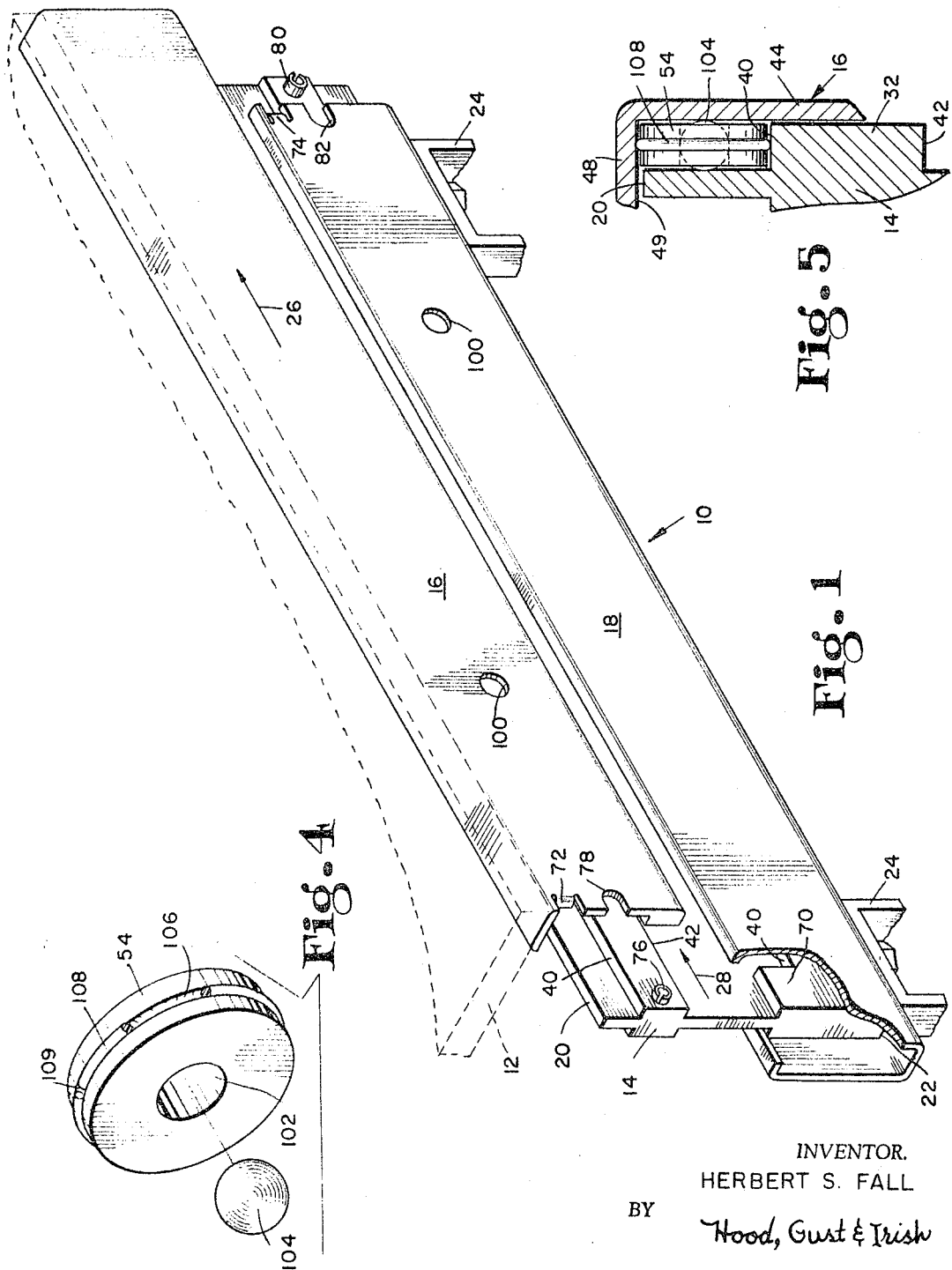
INVENTOR.
HERBERT S. FALL
BY
Hood, Gust & Irish
ATTORNEYS

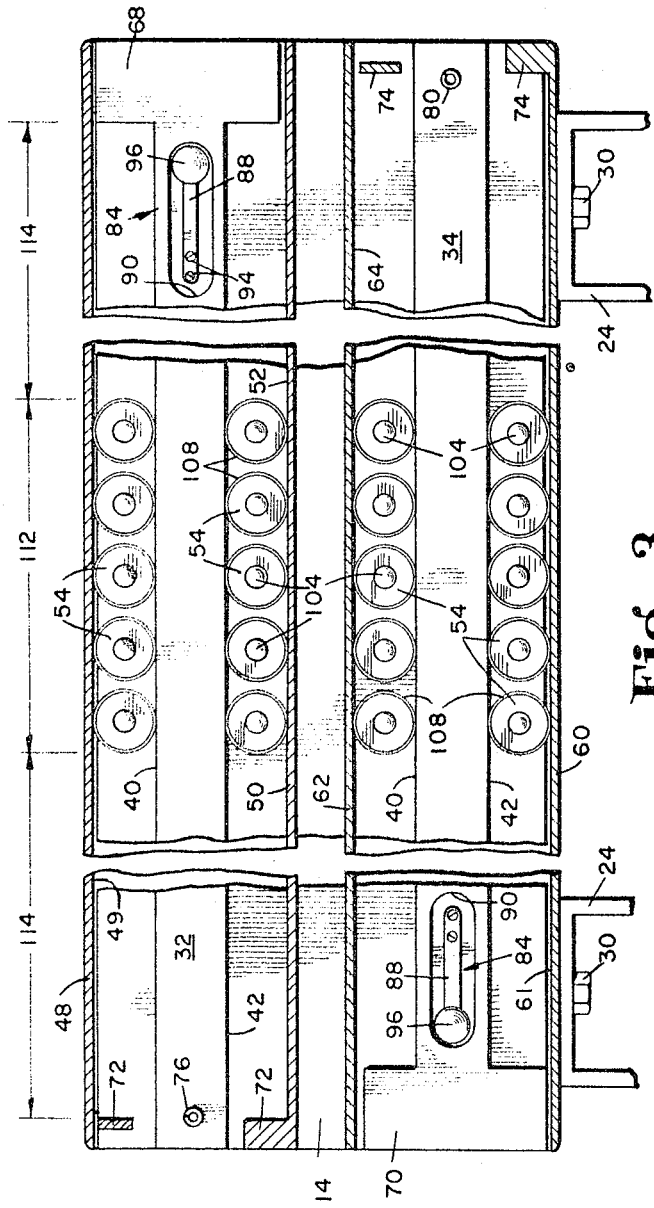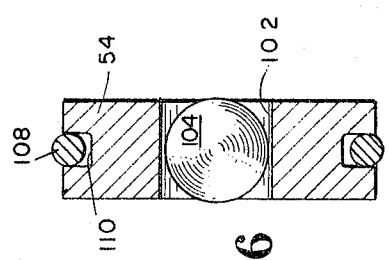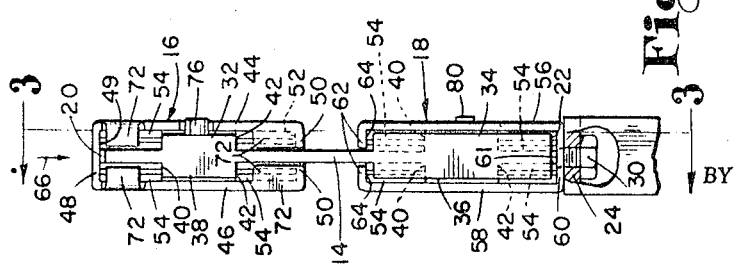

Sept. 2, 1969                  H. S. FALL                 3,464,744
HEAVY-DUTY CHASSIS TRACK
Filed April 19, 1967                              3 Sheets-Sheet 3
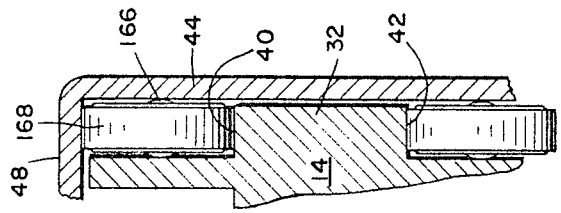
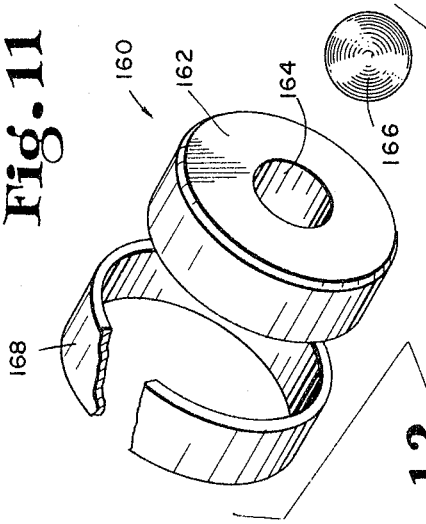
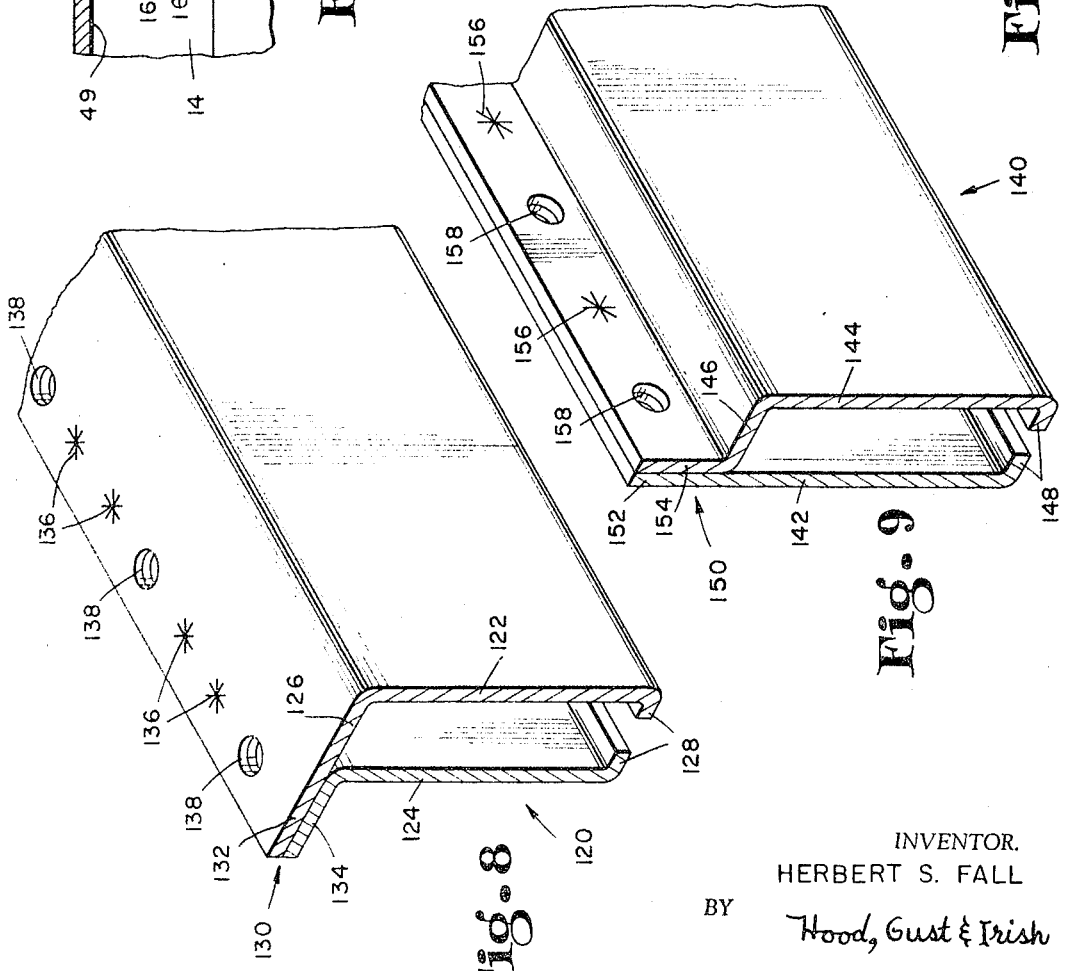
INVENTOR.
HERBERT S. FALL
BY *Hood, Gust & Irish*
ATTORNEYS United States Patent Office 3,464,744
Patented Sept. 2, 1969

3,464,744
HEAVY-DUTY CHASSIS TRACK
Herbert S. Fall, 6248 E. Iona St.,
Indianapolis, Ind. 46203
Filed Apr. 19, 1967, Ser. No. 632,073
Int. Cl. F16c 35/02, 29/00, 21/00
U.S. Cl. 308—3.8                             10 Claims

ABSTRACT OF THE DISCLOSURE

A chassis track comprising a main track unit having upper and lower track units mounted thereon for longitudinal, relative reciprocation therealong, the upper track unit telescopically receiving the upper edge portion of said main track unit and the lower track unit telescopically receiving the lower edge portion of said main track unit. Anti-friction means are carried between the track surfaces of the upper track unit and main track unit and additional anti-friction means are carried between track surfaces of the lower track unit and the main track unit, the track surfaces and anti-friction means being arranged so that any vertical load applied to the chassis track results in vertical compressive loads only on the track units. In preferred embodiments, the anti-friction means are cylindrically-shaped rollers, each of which has a resilient annulus disposed circumferentially thereabout, the annulus being effective resiliently to engage the surfaces on which and under which the roller is carried.

---

The present invention relates generally to chassis tracks, and more particularly to providing a heavy-duty chassis track which is extremely narrow in width and, yet, which will support drawers, slides or trays and the like in a cabinet or on a rack wherein loads as high as one thousand pounds may be imposed on the track.

Prior art chassis tracks capable of movably supporting loads of one thousand pounds have been undesirably wide and have, therefore, utilized valuable space in electronic cabinets and the like. Such prior art chassis tracks have generally embodied a plurality of U-shaped members of decreasing widths between upturned side members, one telescoping within another with roller carrying races or tracks held and spaced apart vertically and laterally therebetween. Such chassis tracks have generally been fabricated from steel or other heavy load-carrying material. One of the problems with such prior art chassis tracks is that they tend to be very noisy in operation, that is, when the chassis tracks are extended and retracted. Such prior art tracks also tend to produce a considerable amount of noise when the cabinet or frame in which they are mounted is rolled around on even the smoothest of floors.

The chassis track of the present invention comprises a main track unit having upper and lower track units mounted thereon for longitudinal, relative reciprocation therealong, the upper track unit telescopically receiving the upper edge portion of the main track unit and the lower track unit telescopically receiving the lower edge portion of the main track unit. Cylindrically-shaped rollers are carried between the track surfaces of the upper track unit and the main track unit and additional cylindrically-shaped rollers are carried between the track surfaces of the lower track unit and the main track unit, all of the track surfaces being horizontal so that any vertical load applied to the chassis track results in vertical compressive loads only on the track units. In preferred embodiments, each roller is provided with a resilient annulus disposed circumferentially thereabout, the annulus being effective to engage resiliently the surfaces on which and under which the roller is carried, thereby damping the noise generated by the roller engaging its track surfaces. Depending on the annulus material, the annulus may also frictionally engage the surfaces on which and under which the roller is carried to prevent slippage of the surfaces on the roller.

It is to be pointed out that by providing for compressive loading only of the track units, the chassis track of the present invention can be made very narrow. As an example, a chassis track constructed in accordance with the present invention and which is approximately one-half inch wide and three and one-half inches tall and which has an extended length which is approximately twice its retracted length can carry loads up to one thousand pounds.

It is an object of the present invention, therefore, to provide a chassis track which is capable of carrying very heavy loads and which is very narrow in width.

Another object of the present invention is to provide such a chassis track which is quiet in operation.

Still a further object of the present invention is to provide such a chassis track wherein all of the load is carried by a plurality of cylindrically-shaped rollers each of which is provided with a resilient annulus disposed circumferentially thereabout, the annulus being effective to engage the surfaces on which and under which the roller is carried.

Further objects of the invention will appear as the description proceeds.

To the accomplishment of the above and related objects, the present invention may be embodied in the form illustrated in the accompanying drawings, attention being called to the fact, however, that the drawings are illustrative only, and that change may be made in the specific construction illustrated and described, so long as the scope of the appended claims is not violated.

In the drawings:

FIG. 1 is a perspective view of the chassis track of the present invention showing the upper track unit in a fully extended position;

FIG. 2 is an end view of the chassis track shown in FIG. 1;

FIG. 3 is a sectional view taken generally along the line 3—3 in FIG. 2 and showing rollers which support the upper track unit on the main track unit and rollers which support the main track unit on the lower track unit;

FIG. 4 is an exploded, partially sectioned, perspective view of a preferred roller assembly;

FIG. 5 is a fragmentary, partially sectioned view showing the roller of FIG. 4 carried on a track surface of the main track unit and under a track surface of the upper track unit;

FIG. 6 is a sectional view of a roller, such as the roller of FIG. 5, showing a deep, square circumferential groove and a ring disposed in the groove;

FIG. 7 is a fragmentary, sectional view showing a preferred means for limiting the travel of either the upper or lower track unit relative to the main track unit;

FIG. 8 is a fragmentary, perspective view showing another form of the upper track unit and lower track unit;

FIG. 9 is a fragmentary, perspective view showing still another form of the upper track unit and lower track unit;

FIG. 10 is a fragmentary, partially sectioned view showing still another roller which is carried between the track surfaces of the upper track unit and main track unit;

FIG. 11 is a fregmentary, sectional view, similar to the end view of FIG. 5, showing the roller of FIG. 10 carried between the track surfaces of the upper and main track units; and FIG. 12 is an exploded, perspective view, similar to FIG. 4, showing the roller assembly of FIG. 10.

The chassis track of the present invention, indicated generally by the reference number 10, is ideally suited for movably supporting drawers, platforms, etc., such as the platform 12 indicated by dashed lines in FIG. 1. The platform 12 is merely illustrative and, of course, other types of loads may be movably supported on the chassis track 10. In some cases, it may be desirable to mount a second chassis track on the chassis track 10 thereby substantially doubling the extension-capability of the chassis track. It is also possible to mount two or more of the chassis tracks side by side to increase the load carrying capacity.

The chassis track 10 comprises a main track unit 14 having an upper track unit 16 and a lower track unit 18 mounted thereon for longitudinal, relative reciprocation therealong, the upper track unit 16 telescopically receiving the upper edge portion 20 of the main track unit 14 and the lower track unit 18 telescopically receiving the lower edge portion 22 of the main track unit 14. When the lower track unit 18 is rigidly mounted on stationary brackets, such as the stationary brackets 24 as shown in FIGS. 1, 2, and 3, the upper track unit 16 will move in the direction of the arrow 26 on the main track unit 14 and the main track unit 14 will move in the direction of the arrow 28 on the lower track unit 18. Thus, the platform 12 is movable in the direction of the arrows 26 and 28 by an amount equal to the extensibility of the upper track unit 16 on the main track unit 14 plus the extensibility of the main track unit 14 on the lower track unit 18. Each of the stationary brackets 24 may be rigidly fastened to the lower track unit 18 by means of a screw 30 or other equivalent fastening means.

Referring now to FIGS. 2 and 3, it will be seen that the main track unit 14 is essentially a bar having upper and lower, longitudinally extending, generally parallel tracks provided on each side thereof, the tracks being indicated by the reference numbers 32, 34, 36 and 38 in FIG. 2. Each of the tracks 32–38 provides upper and lower, generally horizontal track surfaces 40 and 42, respectively.

Referring further to FIG. 2, it will be seen that the upper track unit 16 is an inverted, generally U-shaped channel arranged to telescopically receive the upper portion of the main track unit 14 including the upper tracks 32 and 38. Specifically, the upper track unit 16 comprises a pair of vertical wall sections 44 and 46 joined at their upper edges by a horizontal wall section 48, the lower surface of the horizontal wall section 48 providing a track surface 49 which is substantially parallel with and spaced apart from the upper track surfaces 40 of the tracks 32 and 38. Each of the vertical wall sections 44 and 46 is provided, at its lower edge, with an inwardly and longitudinally extending shoulder 50, the upper surface 52 of which is spaced apart from and parallel with the lower track surfaces 42 of the upper tracks 32 and 38.

As clearly seen in FIG. 3, anti-friction means are provided for movably supporting the upper track unit 16 on the main track unit 14, the anti-friction means comprising rollers 54 carried on the upper track surfaces of the tracks 32 and 38 and under the surface 49 of the wall section 48 and additional rollers 54 carried on the surfaces 52 of the shoulders 50 and under the surfaces 42 of the tracks 32 and 38. A preferred roller 54 structure will be discussed farther along in this description.

The lower track unit 18 is a generally U-shaped channel arranged to telescopically receive the lower portion of the main track unit 14 including the lower tracks 34 and 36. The lower track unit 18 comprises a pair of vertical wall sections 56 and 58 joined at their lower edges by a horizontal wall section 60, the upper surface 61 of which is substantially parallel to the lower surfaces 42 of the tracks 34 and 36.

Each of the vertical wall sections 56 and 58 is provided, at its upper edge, with an inwardly and longitudinally extending shoulder 62, the lower surface 64 of which is substantially parallel to and spaced apart from the upper surfaces 40 of the lower tracks 34 and 36.

In recapitulation, it can be seen that all of the track surfaces 40, 42, 49, 52, 61 and 64 are horizontal, planar surfaces.

Anti-friction means are provided for movably supporting the main track unit 14 on the lower track unit 18, the anti-friction means comprising rollers 54 carried on the upper track surfaces 40 of the tracks 34 and 36 and under the lower track surfaces 64 of the shoulders 62 and additional rollers 54 carried on the upper surface 61 of the wall section 60 and under the lower surfaces 42 of the tracks 34 and 36. Antifriction means are also provided for movably supporting the upper track unit 16 on the main track unit 14, these last-mentioned anti-friction means comprising rollers 54 carried on the upper surfaces 40 of the tracks 32 and 38 and under the surface 49 of the horizontal wall section 48 and additional rollers 54 carried on the surfaces 52 of the shoulders 50 and under the surfaces 42 of the tracks 32 and 38.

Since all the track surfaces 40, 42, 49, 52, 61 and 64 are horizontal and since the axes of all the rollers 54 are horizontal, a load applied vertically in the direction of the arrow 66 shown in FIG. 2 results in vertical compressive loads only on the main track unit 14, upper track unit 16 and lower track unit 18. When such a load is applied to the chassis track 10 and the chassis track 10 is retracted as shown in FIG. 2, the entire load is carried by the rollers 54 carried on the upper track surfaces 40 of the upper tracks 32 and 38 and under the track surface 49 of the horizontal wall section 48 and the rollers 54 carried on the upper track surface 61 of the wall section 60 and under the lower track surfaces 42 of the tracks 34 and 36. When the track unit 16 is extended in the direction of the arrow 26 on the main track unit 14 and the main track unit 14 is extended in the direction of the arrow 28 on the lower track unit 18 and a vertical load is applied to the upper track unit 16, the load will be applied to all of the rollers 54. That is, when the track unit 16 is extended in the direction of the arrow 26 and a load is applied to the track unit 16, the right-hand end of the track unit 16 (FIG. 3) is urged downwardly to apply a compressive load to the rollers 54 carried on the upper track surfaces 40 of the tracks 32 and 38 and under the track surface 49 of the wall section 48 and the left-hand end of the track unit 16 (FIG. 3) is urged upwardly to apply a compressive load to the rollers 54 carried on the upper track surfaces 52 of the shoulders 50 and under the track surfaces 42 of the tracks 32 and 38. Similarly, loads are applied to the rollers 54 supporting the main track unit 14 on the lower track unit 18.

Since only vertical, compressive loads are involved, the main track unit 14 and the wall sections 44, 46, 56 and 58 may be made quite thin.

As seen in FIG. 3, the right-hand end of the upper track 32 is provided with an enlarged portion 68 and the left-hand end of the lower track 34 is provided with an enlarged portion 70. The lower track 36 and upper track 38 are also provided with similar enlarged portions, not shown, the enlarged portion of the lower track 36 being at the left-hand end, and the enlarged portion of the upper track 38 being at the right-hand end. The enlarged portions, such as the enlarged portion 68, provide an abutment or auxiliary stop for the rollers 54. The upper track unit 16 is provided at its left-hand end (FIGS. 1 and 3) with tab portions 72 which also serve as abutments or auxiliary stops for the rollers 54. Similarly, the lower track unit 18 is provided at its right-hand end with tab portions 74 which also serve as auxiliary stops or abutments for the rollers 54.

Movement of the upper track unit 16 on the main track unit 14 in the direction opposite to the arrow 26 is limited by the provision of a roll pin 76 which is carried at the left-hand end of the main track unit 14 and which engages a notch 78 in the left-hand end of the upper track unit 16.

Similarly, movement of the main track unit 14 in a direction opposite to the arrow 28 is limited by the provision of a roll pin 80 which is carried at the right-hand end of the main track unit 14 and which engages a notch 82 in the right-hand end of the lower track unit 18.

In a preferred embodiment, stop means, indicated generally by the reference numbers 84 in FIG. 3, are provided for limiting the movement of the upper track unit 16 on the main track unit 14 and for limiting the movement of the main track unit 14 on the lower track unit 18. Referring now to FIG. 7, a preferred structure for the stop means 84 will be discussed.

Each stop means 84 comprises a cylindrically-shaped stop button 86 and a leaf spring 88 carried in a cut-out 90 in the main track unit 14. Referring to FIG. 3, it will be seen that such a cut-out 90 is provided in each of the tracks 32 and 34. The stop button 86 is carried by the forward end of the leaf spring 88, which spring is arranged to urge the button 86 outwardly in the direction of the arrow 92 (FIG. 7). The rearward end of the spring 88 is rigidly fastened to the bottom of the cut-out 90 as indicated at 94. The stop button 86 is provided with a rounded surface 96 which engages the inside surface of its adjacent vertical wall section, such as the vertical wall section 44. The vertical wall sections 44 and 56 are provided with apertures 100 for receiving the stop buttons 86 of their respective stop means 84. That is, when the wall section 44 (track unit 16) is moved in the direction of the arrow 98 (FIG. 7), the stop button 86 will enter the aperture 100 and stop the movement of the wall section 44 relative to the main track unit 14. The stop button 86 may be disengaged from its aperture 100 merely by pushing it back into its cut-out 90 and moving the track unit 16 or 18 associated therewith relative to the main track unit 14.

Thus, from the above description, it can be seen that one of the stop means 84 is provided for automatically stopping the movement of the upper track unit 16 on the main track unit 14 before the rollers 54 supporting the upper track unit 16 are engaged and stopped by the enlarged portions 68 of the tracks 32 and 38 and the tab portions 72. Likewise, the other stop means 84 is provided for automatically stopping the movement of the main track unit 14 on the lower track unit 18 before the rollers 54 which support the main track unit 14 are engaged and stopped by the enlarged portions 70 of the tracks 34 and 36 and the tab portions 74. The reason for so stopping the upper track unit 16 and the main track unit 14 will become apparent as this description progresses. It can be seen, however, that if for some reason the stop means 84 cooperating with the upper track unit 16 fails, the stop means provided by the enlarged portions 68 and tab portion 72 will stop the movement of the upper track unit 16. Likewise, if the stop means 84 cooperating with the lower track unit 18 fails, the enlarged portions 70 and tab portions 74 will act to stop movement of the main track unit 14 on the lower track unit 18.

As seen in FIGS. 4 and 5, one preferred roller 54 is a short, cylindrically-shaped roller having an axially centered hole 102 therethrough. A ball bearing 104, which may be fabricated from a plastic-like material, is rollably carried in the hole 102, the ball bearing 104 having a diameter at least a few thousandths of an inch greater than the width of the roller 54, but smaller than the diameter of the hole 102. This ball bearing 104 serves to take the lateral thrust between the track units 14, 16 and 18 rather than to allow that thrust to be taken on the sides of the rollers 54. This feature, which is clearly shown in FIG. 5, serves to eliminate any lateral binding which would tend to make the chassis track 10 difficult to operate. Also, if the bearing 104 is either plastic or rubber, the bearing 104 will serve to dampen the noise produced by the roller 54. Referring to FIG. 5, it will be seen that each bearing 104 is carried between the inside surface of a vertical wall section, such as the vertical wall section 44, and the vertical wall of the main track unit 14.

Each of the preferred rollers 54 is provided with a circumferential groove 106 in which a resilient annulus 108 is disposed. The annulus 108 may be fabricated from a plastic-like or rubber-like material, as indicated by the section thereof in FIG. 4, or the annulus 108 may be fabricated from a metallic spring material. If the annulus 108 is metallic, a gap, such as that indicated at 109, preferably is provided to permit installation of the annulus 108 in the groove 106 and to provide for expansion of the annulus 108 under load.

As seen in FIG. 5, the annulus 108 is effective resiliently to engage the surfaces on which and under which the roller 54 is carried, thereby preventing rattling of the roller 54 against its track surfaces.

It is not intended that each annulus 108 carry the load applied to its roller 54, but merely that each annulus 108 will act to prevent the roller on which it is carried from rattling.

The groove 106, shown in FIG. 4, has a rounded transverse section. It may be desirable to provide a groove, such as the groove 110 in FIG. 6, which is deep and square, especially if the annulus 108 is fabricated from a metallic, spring-like material as indicated by the section thereof in FIG. 6. Such a groove 110 desirably has a depth and width greater than the thickness of the annulus 108 which is disposed therein. Thus, when the roller 54 is loaded, the annulus 108 is fully received in the groove 110 and the entire load is carried on the cylindrical surface of the roller.

In one preferred form of the present invention, the rollers 54 are used in groups, herein shown as groups of five rollers 54, and each roller 54 is spaced apart from its adjacent roller 54. Preferably, the longitudinal spacing between adjacent rollers 54 is maintained at all times when the chassis track 10 is extended and retracted. This spacing between adjacent rollers is maintained by the resilient annuli 108 which provide, by reason of their diametrically-expansive resilience, such a degree of frictional engagement between the rollers 54 and the surfaces on which the rollers 54 run as to prevent any slippage. It is to be noted that by providing such spacing, the possibility of a rubbing action between adjacent rollers 54 which would retard the movement of the track units 14 and 16 is prevented. It can be seen, therefore, the upper track unit 16 is not permitted to move unless the rollers 54 on which it is supported rotate a corresponding amount and the main track unit 14 is not permitted to move unless the rollers 54 on which it is supported rotates a corresponding amount.

Referring again to FIG. 3, it will be seen that each group of five rollers occupies a longitudinal space indicated by the reference number 112, the length of the space 112 remaining constant regardless of the position of the upper track unit 16 on the main track unit 14 or the position of the main track unit 14 on the lower track unit 18. Thus, since the length of the space 112 remains constant, the upper track unit 16 may move in the direction of the arrow 26 a distance indicated by the reference number 114, or until the roller 54 which is farthest to the right (FIG. 3) approaches the enlarged portion 68 and the tab portion 72 approaches the roller 54 which is farthest to the left. When the track unit 16 has moved the distance 114, the stop means 84 will automatically operate to prevent further movement. Similarly, the main track unit 14 will move in the direction of the arrow 28 a distance equal to that indicated by the reference number 114.

Referring now to FIGS. 8 and 9, two different forms of upper and lower track units will be discussed. The track unit 120 of FIG. 8, which comprises vertical wall sections 122 and 124, longitudinal wall section 126 and longitudinally, inwardly extending shoulders 128, is proportioned and arranged telescopically to receive the upper or lower edge portion of the main track unit 14 in the same manner that the upper track unit 16 and lower track unit 18 receives the upper and lower edge portions, respectively, of the main track unit 14. The track unit 120 is provided with a horizontally and longitudinally extending mounting flange, indicated generally by the reference number 130, which includes a horizontal extension 132 of the horizontal wall section 126 and a horizontal flange 134 which extends from the upper edge of the wall section 124, the extension 132 and flange 134 being spot welded, or otherwise securely fastened, together, as indicated at 136. Mounting holes 138 are provided in the flange 130.

The track unit 140 (FIG. 9), which comprises vertical wall sections 142 and 144, a horizontal wall section 146 and longitudinally and inwardly extending shoulders 148, is also proportioned and arranged telescopically to receive the upper or lower edge portion of the main track unit 14 in the same manner that the upper track unit 16 and lower track unit 18 receive the upper and lower edge portions, respectively, of the main track unit 14. A vertically and longitudinally extending mounting flange, indicated generally by the reference number 150, is provided on the track unit 140, the flange 150 comprising a vertical extension 152 of the wall section 142 and a vertical flange 154 which extends upwardly from the left-hand edge of the wall section 146. The extension 152 and flange 154 being spot welded, or otherwise securely fastened, together, as indicated at 156. The usual mounting holes 158 are provided in the flange 150.

The track units 120 and 140 are generally U-shaped units as discussed above in conjunction with the track units 16 and 18, the only differences being the flanges 130 and 150 provided on the track units 120 and 140, respectively. The flanges 130 and 150, of course, facilitate mounting of the chassis track on a supporting structure.

It will be apparent that two separate parts which comprise the track unit 12 may be spot welded together after the parts are positioned relative to the main track unit 14 to retain the rollers 54 on the proper track surfaces. Similarly, the two parts comprising the track unit 140 may be joined after they are so positioned.

Referring now to FIGS. 10, 11 and 12, still another antifriction means will be discussed. This anti-friction means, indicated generally by the reference number 160, comprises a cylindrically-shaped roller 162 having an axially centered hole 164 therethrough. A ball bearing 166 is rollably carried in the hole 164, the ball bearing 166 having a diameter which is, at least, a few thousandths of an inch greater than the width of the roller 162, but smaller than the diameter of the hole 164. The ball bearing 166 serves the same function as the ball bearing 104, as seen in FIG. 11. The roller 162 is received in an annulus 168 which has an internal diameter greater than the external diameter of the roller 162 and a width substantially equal to the width of the roller 162, the annulus, preferably, having a flat, rectangular cross section as indicated in FIG. 12. The annulus 168, which may be fabricated from any suitable resilient material, such as steel, is effective to engage resiliently the surfaces on which and under which the anti-friction means 160 is carried. Referring to FIG. 10, it will be seen that the annulus 168 deflects under load so that the roller 162 actually carries the load. Of course, the deflection of the annulus 168 in FIG. 10 is greatly exaggerated for purposes of illustration. When the load which urges the track surface 49 toward the track surface 40 is removed, the annulus 168 will assume its natural cylindrical shape. Depending on the type of material used to fabricate the annulus 168, the annulus 168 may frictionally engage the surfaces on which and under which it is carried to prevent slippage of the surfaces relative to the annulus.

It will be apparent that one advantage of the annulus 168 is that, when the annulus is deflected under load as suggested in FIG. 10, there is a greater area of contact between the annulus and the track surfaces on which and under which the annulus is carried than there would be between a rigid, cylindrical roller and the same track surfaces. Thus, greater loads may be carried by the chassis track without indenting the track surfaces on which and under which the annuli 168 are carried, even when the track surfaces are formed from a relatively soft material, such as aluminum. It will be noted that, theoretically, there is only a line contact between a rigid, cylindrical roller and a flat track surface.

Another advantage of the illustrative annulus 168 is its shock absorbing capabilities, especially when deflected as suggested in FIG. 10. Thus, it may be desirable to provide a chassis track 10 including the illustrative anti-friction means 160, but which does not include the stop means 84 which prevent the anti-friction means 160 from being engaged by enlarged portions 68 and 70 and tab portions 72 and 74 (FIG. 3). In such an embodiment, each annuli 168 would serve as a shock absorber when the main track unit 14 is moved to the end of its travel relative to the upper track unit 16 and the lower track unit 18 is moved to the end of its travel relative to the main track unit 14. If the anti-friction means 160 are used in groups of five as suggested in FIG. 3, there will be, in effect, twenty shock absorbers (annuli 168) resiliently stopping the movement of the main track unit 14 on the upper track unit 16 and twenty shock absorbers resiliently stopping the movement of the lower track unit 18 on the main track unit.

Finally, it will be apparent that the various anti-friction means described herein can be used in various combinations in the same chassis track. That is, it may be desirable to use the anti-friction means 160 illustrated in FIG. 11 in combination with the anti-friction means (roller 54) illustrated in FIG. 4.

What is claimed is:

1. A chassis track comprising a bar having upper and lower, longitudinally extending, generally parallel tracks provided on each side thereof, each of said tracks defining upper and lower, generally horizontal track surfaces, an inverted, generally U-shaped, upper unit arranged to telescopically receive the upper portion of said bar including the uppermost track on each side thereof, said upper unit comprising a pair of first vertical wall sections joined at their upper edges by a first horizontal wall section, each of said first vertical wall sections being provided at its lower edge with an inwardly and longitudinally extending shoulder, the upper surface of which is parallel with said track surfaces, a generally U-shaped, lower unit arranged to telescopically receive the lower portion of said bar including the lowermost track on each side thereof, said lower unit comprising a pair of second vertical wall sections joined at their lower edges by a second horizontal wall section, each of said second vertical wall sections being provided at its upper edge with an inwardly and longitudinally extending shoulder, the lower surface of which is parallel with said track surfaces, anti-friction means for supporting said upper unit on said bar, said anti-friction means comprising rollers carried on said upper tracks and under said first horizontal wall section and additional rollers carried on said shoulders of said first vertical wall sections and under said upper tracks, and anti-friction means for supporting said bar on said lower unit, said second-mentioned anti-friction means comprising rollers carried on said second horizontal wall section and under said lower tracks and additional rollers carried on said lower tracks and under said shoulders of said second wall sections.

2. A chassis track as in claim 1 wherein said rollers are cylindrically-shaped rollers having horizontally extending axes, each of said rollers being provided with a circumferential groove and an annulus disposed in said groove, said annulus being effective resiliently to engage the surfaces on which and under which said roller is carried, thereby damping the noise produced by said roller engaging said surfaces.

3. A chassis track as in claim 2 wherein said bar, upper unit, lower unit and said rollers are metal and wherein said annuli are fabricated from a resilient, plastic-like material.

4. A chassis track as in claim 2 wherein said bar, upper unit, lower unit, roller and annuli are metal and wherein each of said grooves has a depth and width greater than the thickness of said annulus received therein.

5. A chassis track as in claim 1 wherein said upper surfaces of said upper tracks lie in the same plane, wherein said lower surfaces of said upper tracks lie in the same plane, wherein said upper surfaces of said lower tracks lie in the same plane, and wherein the lower surfaces of said lower tracks lie in the same plane.

6. A chassis track comprising a main track unit and first and second track units mounted for longitudinal, relative reciprocation on said main track unit, said main track unit comprising a bar having upper and lower longitudinally extending ridges provided on each side thereof, each of said ridges defining upper and lower parallel and generally horizontal track surfaces, the upper bridges providing a pair of upper and a pair of lower track surfaces and the lower ridges providing a pair of upper and a pair of lower track surfaces, said first track unit comprising a pair of first vertical wall sections and a first horizontal wall section, said first horizontal wall section joining said first vertical wall sections at their upper edges, said first track unit telescopically receiving the upper portion of said main track unit including said upper ridges, each of said first vertical wall sections being provided at its lower edge with a longitudinally and inwardly extending shoulder, the upper surface of which is parallel to said track surfaces of said upper ridges, the shoulder on each of said first vertical wall sections being spaced apart from and disposed directly below the lower track surface on said upper ridge which is adjacent said first vertical wall section, said second track unit comprising a pair of second vertical wall sections and a second horizontal wall section, said second horizontal wall section joining said second vertical wall sections at their lower edges, said second track unit telescopically receiving the lower portion of said main track unit including said lower ridges, each of said second vertical wall sections being provided at its upper edge with a longitudinally and inwardly extending shoulder, the lower surface of which is parallel to said track surfaces of said lower ridges, the shoulder on each of said second vertical wall sections being spaced apart from and diposed directly above the upper track surface on said lower ridge which is adjacent said second vertical wall sections, anti-friction means movably supporting said first track unit on said main track unit, said anti-friction means comprising rollers carried on said upper track surfaces of said upper ridges and under said first horizontal wall section and additional rollers carried on said upper surfaces of said shoulders and under said lower track surfaces of said upper ridges, and anti-friction means movably supporting said main track unit on said second track unit, said second-mentioned anti-friction means comprising rollers carried on said upper surfaces of said lower ridges and under said lower surfaces of said shoulders and additional rollers carried on said second horizontal wall section and under said lower surfaces of said lower ridges, all of said rollers being cylindrically-shaped and having horizontally extending axes, each of said rollers being provided with a circumferential groove and a resilient annulus disposed in said groove, said annulus being effective to engage the surfaces on which and under which said roller is carried.

7. A chassis track comprising a first track unit and a second track unit, said first track unit being mounted on said second track unit for longitudinal reciprocation therealong, said second track unit being formed to provide a longitudinally extending, generally horizontal, upwardly facing track surface and said first track unit being formed to provide a longitudinally extending, generally horizontal, downwardly facing track surface which is disposed in vertical registry with said upwardly facing track surface, anti-friction means rolling freely on said upwardly facing track surface and under and in free rolling contact with said downwardly facing track surface, said anti-friction means comprising a cylindrically-shaped roller having a circumferential groove formed therein and a resilient annulus carried in said groove, said annulus being effective to engage said track surfaces, thereby damping the noise produced by said roller rollably engaging said track surfaces, said roller being provided with an axially extending hole and a resilient ball bearing rollably carried in said hole, said ball bearing having a diameter which is less than the diameter of said hole and greater than the axial length of said roller, and wherein said first and second track units are formed to provide spaced, facing surfaces laterally bounding said track surfaces, said bearing being rollably carried between said facing surfaces.

8. A chassis track comprising a first track unit and a second track unit, said first track unit being mounted on said second track unit for longitudinal reciprocation therealong, said second track unit being formed to provide a longitudinally extending, generally horizontal, upwardly facing track surface and said first track unit being formed to provide a longitudinally extending, generally horizontal, downwardly facing track surface which is disposed in vertical registry with said upwardly facing track surface, anti-friction means rolling freely on said upwardly facing track surface and under and in free rolling contact with said downwardly facing track surface, said anti-friction means comprising a cylindrically-shaped roller, a resiliently deformable annulus circumferentially disposed about said roller, said annulus being effective resiliently to engage said track surfaces, said annulus having a generally flat, rectangular wall section, said wall section having a width which is substantially equal to the width of said roller, the internal diameter of said annulus being larger than the external diameter of said roller, said annulus being effective, when deflected under load, to increase the contact area between the annulus and said track surfaces.

9. A chassis track comprising a first track unit and a second track unit, said first track unit being mounted on said second track unit for longitudinal reciprocation therealong, said second track unit being formed to provide a longitudinally extending generally horizontal, upwardly facing track surface and said first track unit being formed to provide a longitudinally extending, generally horizontal, downwardly facing track surface which is disposed in vertical registry with said upwardly facing track surface, a plurality of anti-friction means rolling freely on said upwardly facing track surface and under and in free rolling contact with said downwardly facing track surface, each anti-friction means including a cylindrically-shaped roller having a circumferential groove formed therein and a resilient annulus carried in said groove, each said annulus being fabricated from a material which frictionally engages said track surfaces to provide a frictional driving connection between the roller on which said annulus is carried and said track surfaces, thereby preventing slippage between said track surfaces and said roller, each said annulus being effective to damp the noise produced by the roller on which said annulus is carried rollably engaging said track surfaces, and said annuli being effective to maintain spacing between adjacent anti-friction means.

10. A chassis track comprising a first track unit and a second track unit, said first track unit being mounted on said second track unit for longitudinal reciprocation therealong, said second track unit being formed to provide a longitudinally extending generally horizontal, upwardly facing track surface and said first track unit being formed to provide a longitudinally extending, generally horizontal, downwardly facing track surface which is disposed in vertical registry with said upwardly facing track surface, a pair of anti-friction means rolling freely on said upwardly facing track surface and under and in free rolling contact with said downwardly facing track surface, each anti-friction means including a cylindrically-shaped roller having a circumferential groove formed therein and a resilient annulus carried in said groove, each said annulus being fabricated from a material which frictionally engages said track surfaces to provide a frictional driving connection between the roller on which said annulus is carried and said track surfaces, thereby preventing slippage between said track surfaces and said roller, each said annulus being effective to damp the noise produced by the roller on which said annulus is carried rollably engaging said track surfaces, and a group of rollers rolling freely on said upwardly facing track surface and under and in free rolling contact with said downwardly facing track surface, said group of rollers being disposed between said pair of anti-friction means, said anti-friction means being effective to confine said group of rollers.

References Cited

UNITED STATES PATENTS

| | | | |
|---|---|---|---|
| 1,865,100 | 6/1932 | Gruver | 308—6 |
| 2,157,611 | 5/1939 | Jones et al. | |
| 2,376,121 | 5/1945 | Clark | 312—337 |
| 2,865,685 | 12/1958 | Fall | 308—3.8 |
| 2,873,150 | 2/1959 | Hutzelman | 308—3.8 |
| 3,013,849 | 12/1961 | Tanner | 308—3.8 |
| 3,243,237 | 3/1966 | Sprecher | 308—3.8 |
| 3,353,874 | 11/1967 | Del Vecchio et al. | 308—3.8 |
| 3,371,968 | 3/1968 | Loake | 308—3.8 X |

CARROLL B. DORITY, Jr., Primary Examiner

U.S. Cl. X.R.

308—6; 312—337, 340